(12) United States Patent
Uchimura et al.

(10) Patent No.: US 12,728,738 B2
(45) Date of Patent: Sep. 8, 2026

(54) VEHICLE

(71) Applicant: SUBARU CORPORATION, Tokyo (JP)

(72) Inventors: Takahiro Uchimura, Tokyo (JP); Takashi Umezu, Tokyo (JP); Nozomi Aoyama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 2 days.

(21) Appl. No.: 19/015,455

(22) Filed: Jan. 9, 2025

(65) Prior Publication Data

US 2025/0145030 A1 May 8, 2025

Related U.S. Application Data

(63) Continuation of application No. PCT/JP2023/022065, filed on Jun. 14, 2023.

(51) Int. Cl.
*B60L 53/14* (2019.01)
*B60L 53/53* (2019.01)
*B60L 58/12* (2019.01)

(52) U.S. Cl.
CPC ............... *B60L 53/14* (2019.02); *B60L 53/53* (2019.02); *B60L 58/12* (2019.02)

(58) Field of Classification Search
CPC .......... B60L 53/14; B60L 53/53; B60L 58/12; B60L 2200/28; B60L 2240/545;
(Continued)

(56) References Cited

U.S. PATENT DOCUMENTS 5,488,283 A * 1/1996 Dougherty .......... H01M 10/122 320/145
5,559,420 A * 9/1996 Kohchi ............. H01M 10/6551 280/492
(Continued)

FOREIGN PATENT DOCUMENTS

JP 04334906 A * 11/1992
JP 11-341608 A 12/1999
(Continued)

OTHER PUBLICATIONS

JP-04334906-A machine translation (Year: 1992).*
(Continued)

*Primary Examiner* — Angelina M Shudy
(74) *Attorney, Agent, or Firm* — Rimon P.C.

(57) ABSTRACT

A vehicle includes a vehicle battery, a motor generator, a circuit, and a controller. The motor generator receives and outputs electric power from and to the vehicle battery and an external battery. The circuit couples the vehicle battery and the external battery to the motor generator. The controller controls the vehicle battery and the external battery, based on a first mode or a second mode. In the first mode, electric power is transferred between the motor generator and the vehicle battery and between the vehicle battery and the external battery, and not transferred between the motor generator and the external battery. In the second mode, electric power is transferred between the motor generator and the vehicle battery and between the motor generator and the external battery. The controller shifts to the first mode when a load applied to the circuit exceeds a predetermined load in the second mode.

12 Claims, 8 Drawing Sheets

(58) Field of Classification Search

CPC ............... B60L 1/003; B60L 2240/547; B60L 2240/549; B60L 3/0046; B60L 50/16; B60L 50/60; B60L 50/61; B60L 58/13; B60L 58/20; B60L 53/80; Y02T 10/70; G05D 1/00

See application file for complete search history.

(56) References Cited

U.S. PATENT DOCUMENTS 5,583,414 A * 12/1996 Lawrence .................. B63J 3/04 320/DIG. 34
6,390,215 B1 * 5/2002 Kodama ................. B60L 50/62 180/2.1
6,994,560 B2 * 2/2006 Kohchi .............. H01R 13/7036 439/43
8,120,310 B2 * 2/2012 Littrell .................... B60L 8/003 320/109
8,214,108 B2 * 7/2012 Post, II ............. B60W 50/0098 701/2
10,946,766 B2 * 3/2021 Hamada .................... B60L 7/10
11,499,517 B1 * 11/2022 Gopalakrishnan .......................... F02N 11/0866
11,964,587 B2 * 4/2024 Yukawa ................. B60K 6/387
12,021,404 B2 * 6/2024 Ricketts .................... H02J 7/82
12,090,881 B2 * 9/2024 Salter ...................... B60L 53/60
12,139,029 B2 * 11/2024 Jang ........................ B60L 8/003
12,263,799 B2 * 4/2025 Westerlind ................ B60L 1/00
12,617,299 B2 * 5/2026 Orender .................. B60L 50/66
2007/0051542 A1 * 3/2007 Wilks ...................... B60L 53/80 180/65.1
2007/0146951 A1 * 6/2007 Takahashi .............. H02H 3/087 361/93.1
2008/0185197 A1 * 8/2008 Nakamura ............ B60W 10/06 701/112
2010/0065344 A1 * 3/2010 Collings, III ............ B60L 3/10 180/2.1
2010/0141201 A1 * 6/2010 Littrell .................... B60L 8/003 320/101
2010/0305792 A1 * 12/2010 Wilk ....................... B60L 50/61 701/22
2011/0042154 A1 * 2/2011 Bartel ................. B60W 10/184 180/11
2012/0274276 A1 * 11/2012 Endo ................... B60R 25/2018 320/109
2012/0303259 A1 * 11/2012 Prosser ................... B60L 53/57 701/400
2013/0257144 A1 * 10/2013 Caldeira ................. B60L 58/20 307/9.1
2014/0339891 A1 * 11/2014 Ohkawa .................. H02J 7/977 320/134
2014/0375272 A1 * 12/2014 Johnsen .................. B60L 1/006 320/136
2015/0361788 A1 * 12/2015 Liu ......................... H02J 7/855 340/855.4
2016/0052396 A1 * 2/2016 Tsuchiya ................. B60L 58/25 903/907
2017/0015397 A1 * 1/2017 Mitchell ................ B63H 21/17
2017/0368958 A1 * 12/2017 Eun ..................... H01M 10/488
2018/0281615 A1 * 10/2018 Kinoshita ............... B60L 1/003
2020/0086761 A1 * 3/2020 Hamada .................. B60L 58/19
2021/0162883 A1 * 6/2021 Shinohara ............... B60L 58/22
2022/0048404 A1 * 2/2022 Yukawa ................. B60K 6/387
2022/0126714 A1 * 4/2022 Bucknor ................. B60L 53/30
2022/0388425 A1 * 12/2022 Miller ..................... B60L 58/18
2023/0182600 A1 * 6/2023 Salter ........................ B60P 3/06 701/22
2023/0202337 A1 * 6/2023 Ricke ...................... B60L 53/64 705/412
2023/0246471 A1 * 8/2023 Salter ........................ H02J 7/40 320/109
2023/0373315 A1 * 11/2023 Salter .................... B60W 20/00
2023/0378766 A1 * 11/2023 Yin ........................... H02J 4/00
2023/0406150 A1 * 12/2023 Choi ......................... B60L 1/00
2024/0010074 A1 * 1/2024 Salter ........................ B60L 7/10
2024/0100994 A1 * 3/2024 Lee .......................... B60L 53/62
2024/0116383 A1 * 4/2024 Woods .................... B60L 53/60
2024/0157928 A1 * 5/2024 Stanfield ............... B60W 10/04
2024/0262221 A1 * 8/2024 Dieckmann ............. B60L 50/60
2024/0294222 A1 * 9/2024 Yang ....................... B60L 50/64
2024/0375525 A1 * 11/2024 Rohm ..................... B60L 50/60
2024/0391555 A1 * 11/2024 Ozaki ..................... B60L 53/80
2025/0033482 A1 * 1/2025 Safwat .................... B60L 53/53
2025/0249714 A1 * 8/2025 Ghannam ............... B60L 53/57
2026/0027929 A1 * 1/2026 Heseding ................ B60L 53/30
2026/0048683 A1 * 2/2026 Morrill ................... B60L 1/003
2026/0167019 A1 * 6/2026 Kurtz ...................... B60L 15/38

FOREIGN PATENT DOCUMENTS

JP 2012096712 A * 5/2012
JP 2013223369 A * 10/2013
JP 2016022890 A * 2/2016
JP 2020-043718 A 3/2020
JP 7856858 B2 * 5/2026 .............. B60L 58/12
WO 2013/094057 A1 6/2013
WO 2022/255283 A1 12/2022

OTHER PUBLICATIONS

JP-2012096712-A machine translation (Year: 2012).*
JP-2013223369-A machine translation (Year: 2013).*
JP-2016022890-A machine translation (Year: 2016).*
JP-7856858-B2 machine translation (Year: 2026).*
International Search Report received in PCT Application No. PCT/JP2023/022065, dated Sep. 5, 2023.

* cited by examiner 1
2
3
4
11
MOTOR GENERATOR
12
INVERTER
13
VEHICLE BATTERY
14
CONTROLLER
21
CONVERTER
22
TRAILER BATTERY 1
2
3
4
TRAILER BATTERY
22
CONVERTER
21
CONTROLLER
14
VEHICLE BATTERY
13
INVERTER
12
MOTOR GENERATOR
11

FIG. 5

TRAILER BATTERY
22
3
CONVERTER
21
4
CONTROLLER
14
15
VEHICLE BATTERY
13
2
INVERTER
12
1
MOTOR GENERATOR
11

VEHICLE

CROSS-REFERENCE TO RELATED APPLICATIONS

This application is continuation of International Application No. PCT/JP2023/022065, filed on Jun. 14, 2023, the entire contents of which are hereby incorporated by reference.

BACKGROUND

The disclosure relates to the technical field of vehicles.

In the related art, a vehicle has been proposed that travels with a motor supplied with electric power from a main battery mounted on a vehicle body and a sub-battery attachable to and detachable from the vehicle body (for example, see Japanese Unexamined Patent Application Publication No. 11-341608).

SUMMARY

An aspect of the disclosure provides a vehicle including a vehicle battery, a motor generator, a circuit, and a controller. The motor generator is configured to receive and output electric power from and to the vehicle battery and an external battery disposed outside the vehicle. The circuit is configured to couple the vehicle battery and the external battery to the motor generator. The controller is configured to control the vehicle battery and the external battery, based on one of a first mode and a second mode. The first mode is a mode for effecting electric power transfer between the motor generator and the vehicle battery, effecting electric power transfer between the vehicle battery and the external battery, and not effecting electric power transfer between the motor generator and the external battery. The second mode is a mode for effecting electric power transfer between the motor generator and the vehicle battery and effecting electric power transfer between the motor generator and the external battery. The controller is configured to shift to the first mode when a load applied to the circuit exceeds a predetermined load in the second mode.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

FIG. 5 is a diagram illustrating the flow of electric power for driving the motor generator in a boost mode;

DETAILED DESCRIPTION

The vehicle described in the related art section is configured such that the electric power from the sub-battery is preferentially used and, after the sub-battery is depleted, the electric power from the main battery is used. Therefore, no measures are taken for the safety of the vehicle when both the main battery and the sub-battery are used simultaneously.

It is therefore desirable to maintain safety while improving power performance.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Configuration of Vehicle System

Figure 1:
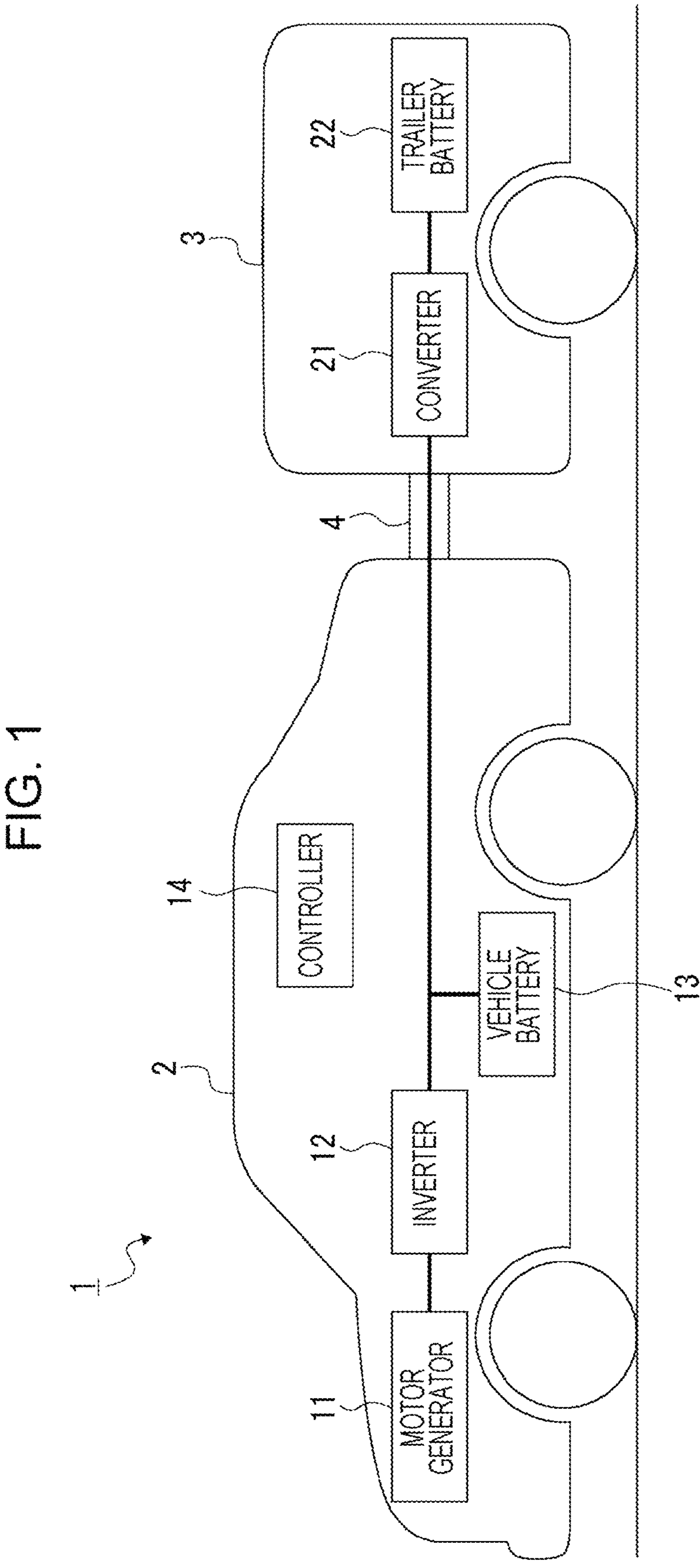
FIG. 1 is a diagram illustrating a schematic configuration of a vehicle system.

FIG. 1 is a diagram illustrating a schematic configuration of a vehicle system 1 according to the embodiment. As illustrated in FIG. 1, the vehicle system 1 includes a vehicle 2 and a trailer 3. The vehicle 2 and the trailer 3 are mechanically and electrically coupled to each other via a coupler 4. The trailer 3 is attachable to and detachable from the vehicle 2.

The vehicle 2 is an electric vehicle including a motor generator 11, an inverter 12, a vehicle battery 13, and a controller 14.

The motor generator 11 is a power source that allows the vehicle 2 to travel. Examples of the motor generator 11 include a three-phase alternating current (AC) motor. The motor generator 11 generates a driving force by electric power supplied from one or both of the vehicle battery 13 and a trailer battery 22, which will be described below, via the inverter 12, and transmits the driving force to driving wheels to allow the vehicle 2 to travel.

The motor generator 11 generates electric power by performing a regenerative operation. The electric power generated by the regenerative operation of the motor generator 11 can be supplied to the vehicle battery 13 and the trailer battery 22 via the inverter 12.

The inverter 12 converts a direct current (DC) current input from the vehicle battery 13 and the trailer battery 22 into a three-phase AC current and outputs the AC current to the motor generator 11. When the motor generator 11 performs a regenerative operation, the inverter 12 converts an AC current input from the motor generator 11 into a DC current and outputs the DC current to the vehicle battery 13 and the trailer battery 22.

The vehicle battery 13 is a so-called high-voltage secondary battery, and is mounted, for example, below a floor of the vehicle 2. The vehicle battery 13 stores electricity to be supplied to the motor generator 11. The vehicle battery 13 can be charged by the regenerative operation of the motor generator 11. The vehicle battery 13 may be chargeable with electric power supplied from the trailer battery 22.

The controller 14 includes one or more computers such as electronic control units (ECUs), and performs overall control of the vehicle 2 and the trailer 3. The controller 14 will be described in detail below.

The trailer 3 has no power source and is towed by the vehicle 2. The trailer 3 includes a converter 21 and the trailer battery 22.

The converter 21 is a DC/DC converter. The converter 21 converts a voltage of a DC current input from the trailer battery 22 and outputs the converted voltage to the vehicle 2 (the motor generator 11 and the vehicle battery 13).

Further, the converter 21 converts a voltage of a DC current input from the vehicle 2 (the motor generator 11) and outputs the converted voltage to the trailer battery 22.

The trailer battery 22 is a so-called high-voltage secondary battery. The trailer battery 22 stores electricity to be supplied to the motor generator 11 and the vehicle battery 13. The trailer battery 22 can be charged by the regenerative operation of the motor generator 11.

In the vehicle system 1 having the configuration described above, since the trailer battery 22 is coupled, the electric power that can be supplied to the motor generator 11 is larger than that of the vehicle 2 alone, and the cruising distance that can be traveled by a single charge can be extended. On the other hand, in the vehicle system 1, since the vehicle 2 tows the trailer 3, the weight as a whole increases, resulting in a decrease in power performance.

In the vehicle system 1, accordingly, both the electric power output from the vehicle battery 13 and the electric power output from the trailer battery 22 are simultaneously supplied to the motor generator 11 to increase the driving force of the motor generator 11, thereby improving the power performance of the vehicle system 1.

Figure 2:
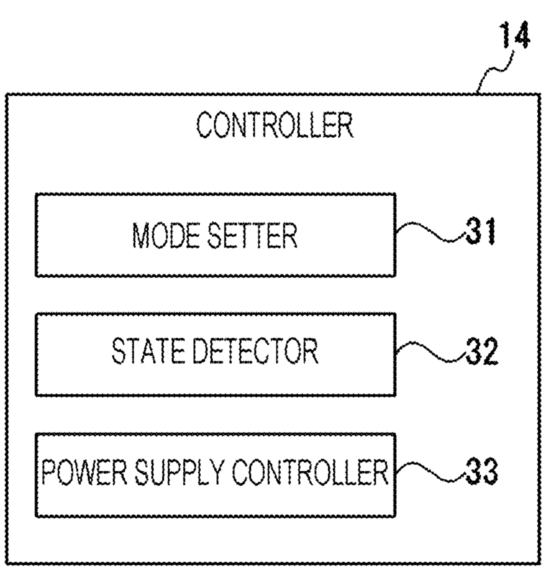
FIG. 2 is a diagram illustrating a functional configuration of a controller.

FIG. 2 is a diagram illustrating a functional configuration of the controller 14. As illustrated in FIG. 2, the controller 14 serves as a mode setter 31, a state detector 32, and a power supply controller 33.

The mode setter 31 sets any one of multiple control modes as a mode for controlling the motor generator 11, the vehicle battery 13, and the trailer battery 22. In the present embodiment, the control modes include a normal mode and a boost mode. The control modes are not limited to these modes, and may include other modes.

The state detector 32 detects states of the vehicle battery 13 and the trailer battery 22. The states to be detected include a state of charge (SOC), a temperature, an input/output current value, a voltage value, and the like, and also include electric power that can be input and electric power that can be output, which are calculated from these values. The electric power that can be input is hereinafter referred to as "inputtable electric power", and the electric power that can be output is hereinafter referred to as "outputtable electric power".

The power supply controller 33 controls the motor generator 11, the vehicle battery 13, and the trailer battery 22, based on the control mode set by the mode setter 31 and the states of the motor generator 11 and the trailer battery 22 detected by the state detector 32.

2. Normal Mode

Figure 3:
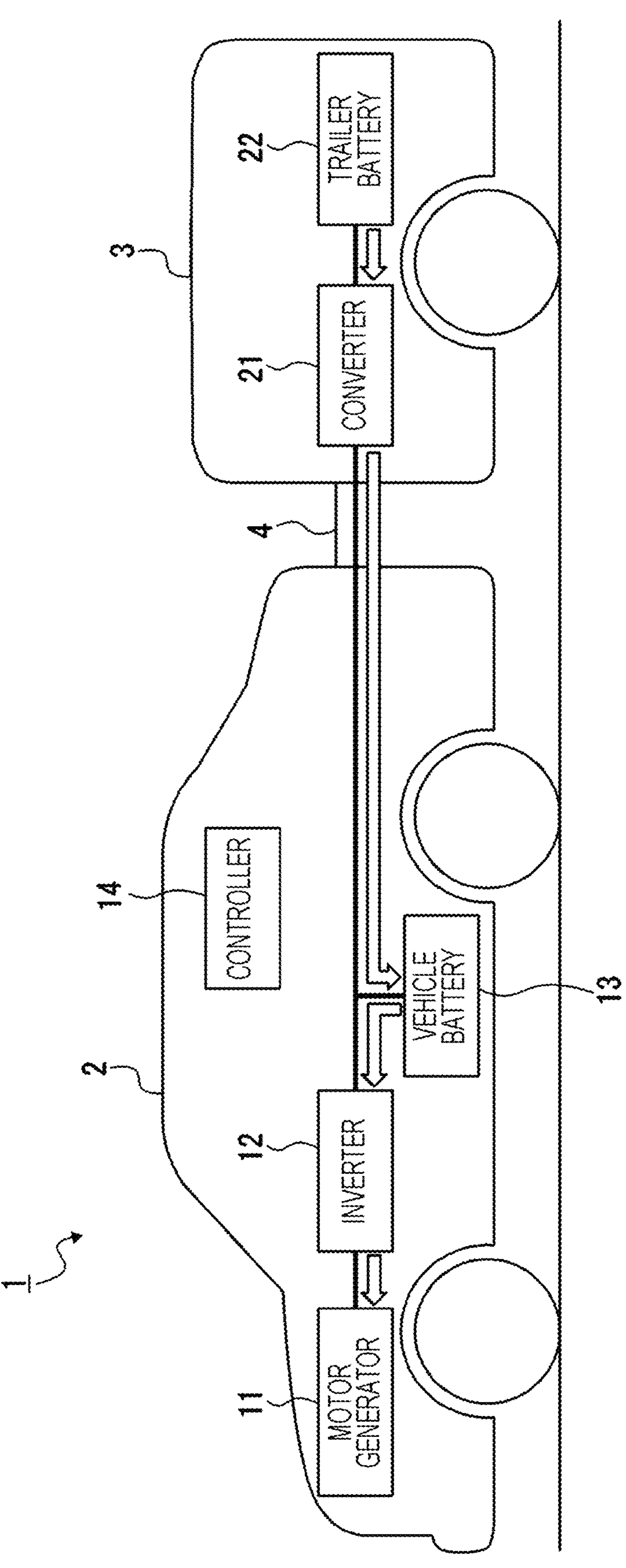
FIG. 3 is a diagram illustrating the flow of electric power for driving a motor generator in a normal mode.

FIG. 3 is a diagram illustrating the flow of electric power for driving the motor generator 11 in the normal mode. In FIG. 3, the flow of electric power is indicated by arrows.

In the normal mode, electric power transfer is performed between the motor generator 11 and the vehicle battery 13, and electric power transfer is performed between the vehicle battery 13 and the trailer battery 22. In the normal mode, however, no electric power transfer is performed between the motor generator 11 and the trailer battery 22.

As illustrated in FIG. 3, when the motor generator 11 is to be driven, electric power is supplied from the vehicle battery 13 to the motor generator 11 via the inverter 12. In a case where the SOC of the vehicle battery 13 is low, electric power is supplied from the trailer battery 22 to the vehicle battery 13 via the converter 21, and the vehicle battery 13 is charged.

Accordingly, the motor generator 11 generates a driving force by the electric power supplied from the vehicle battery 13. Thus, the driving force that can be generated is smaller than that in the boost mode described below.

When the motor generator 11 is to perform the regenerative operation, the electric power generated by the motor generator 11 is supplied to the vehicle battery 13 via the inverter 12, but is not supplied to the trailer battery 22.

Figure 4:
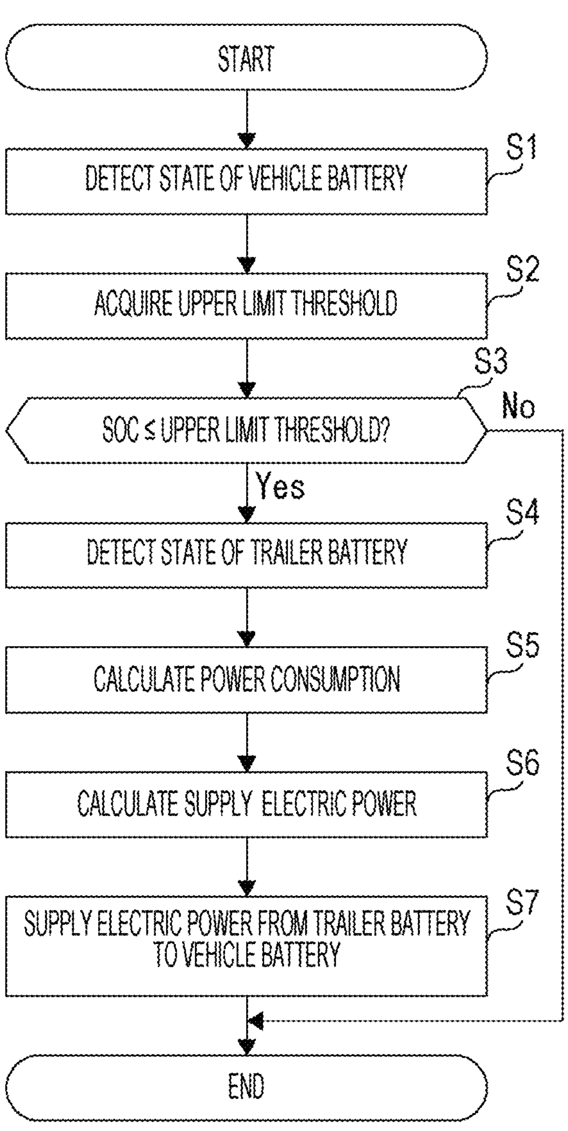
FIG. 4 is a flowchart illustrating a process for controlling a trailer battery in the normal mode.

FIG. 4 is a flowchart illustrating a process for controlling the trailer battery 22 in the normal mode. The process illustrated in FIG. 4 is performed in the normal mode set by the state detector 32.

When the process for controlling the trailer battery 22 is started, the state detector 32 detects the state of the vehicle battery 13 in step S1. Here, the SOC and the inputtable electric power of the vehicle battery 13 are detected.

Subsequently, in step S2, the power supply controller 33 acquires an upper limit threshold for an SOC set in advance by a user. The upper limit threshold indicates an upper limit value of an SOC desired by the user.

In step S3, the power supply controller 33 determines whether the SOC of the vehicle battery 13 is equal to or less than the upper limit threshold. If the SOC of the vehicle battery 13 is not equal to or less than the upper limit threshold (No in step S3), the process illustrated in FIG. 4 ends.

On the other hand, if the SOC of the vehicle battery 13 is equal to or less than the upper limit threshold (Yes in step S3), in step S4, the state detector 32 detects the state of the trailer battery 22. Here, the SOC and the outputtable electric power of the trailer battery 22 are detected.

Subsequently, in step S5, the state detector 32 calculates the electric power output from the vehicle battery 13, that is, the power consumption of the vehicle battery 13. In step S6, the power supply controller 33 calculates the electric power (supply electric power) that can be supplied from the trailer battery 22 to the vehicle battery 13, based on the inputtable electric power and the power consumption of the vehicle battery 13 and the outputtable electric power of the trailer battery 22.

Then, in step S7, the power supply controller 33 performs control to supply the supply electric power calculated in step S6 from the trailer battery 22 to the vehicle battery 13.

3. Boost Mode

Figure 5:
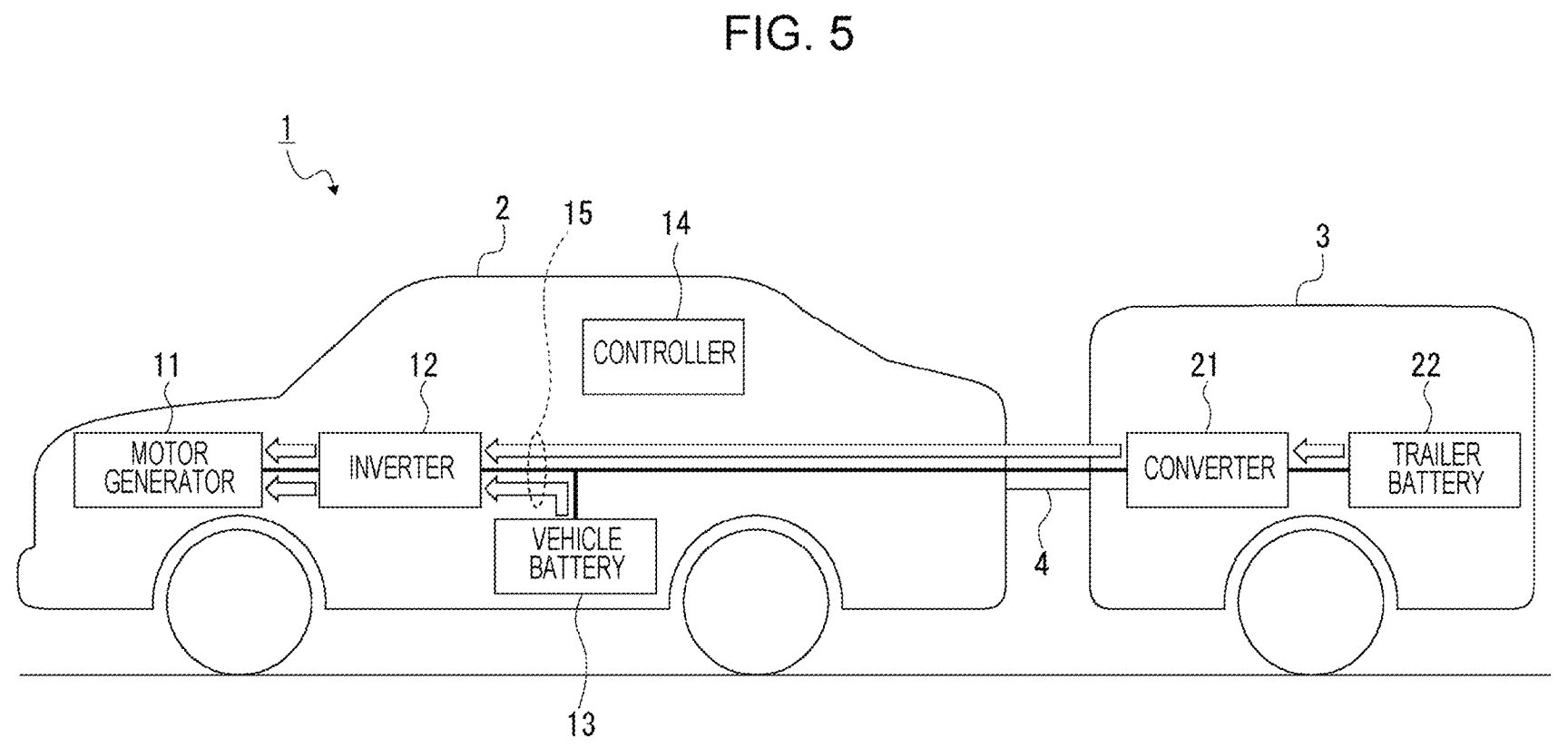

FIG. 5 is a diagram illustrating the flow of electric power for driving the motor generator 11 in the boost mode. In FIG. 5, the flow of electric power is indicated by arrows.

In the boost mode, electric power transfer is performed between the motor generator 11 and the vehicle battery 13, and electric power transfer is performed between the motor generator 11 and the trailer battery 22. At this time, electric power can be simultaneously supplied from the vehicle battery 13 and the trailer battery 22 to the motor generator 11, and electric power can be simultaneously supplied from the motor generator 11 to the vehicle battery 13 and the trailer battery 22.

Accordingly, a large current may flow through a circuit 15 (harness) disposed between the vehicle battery 13 and the motor generator 11 and between the trailer battery 22 and the motor generator 11. A large current flowing through the circuit 15 may cause the circuit 15 to generate heat, resulting in ignition or smoke generation. In the vehicle system 1, accordingly, the following processing is performed to prevent ignition or smoke generation from occurring in the circuit 15. The circuit 15 may include not only the harness but also an electronic component.

Figure 6:
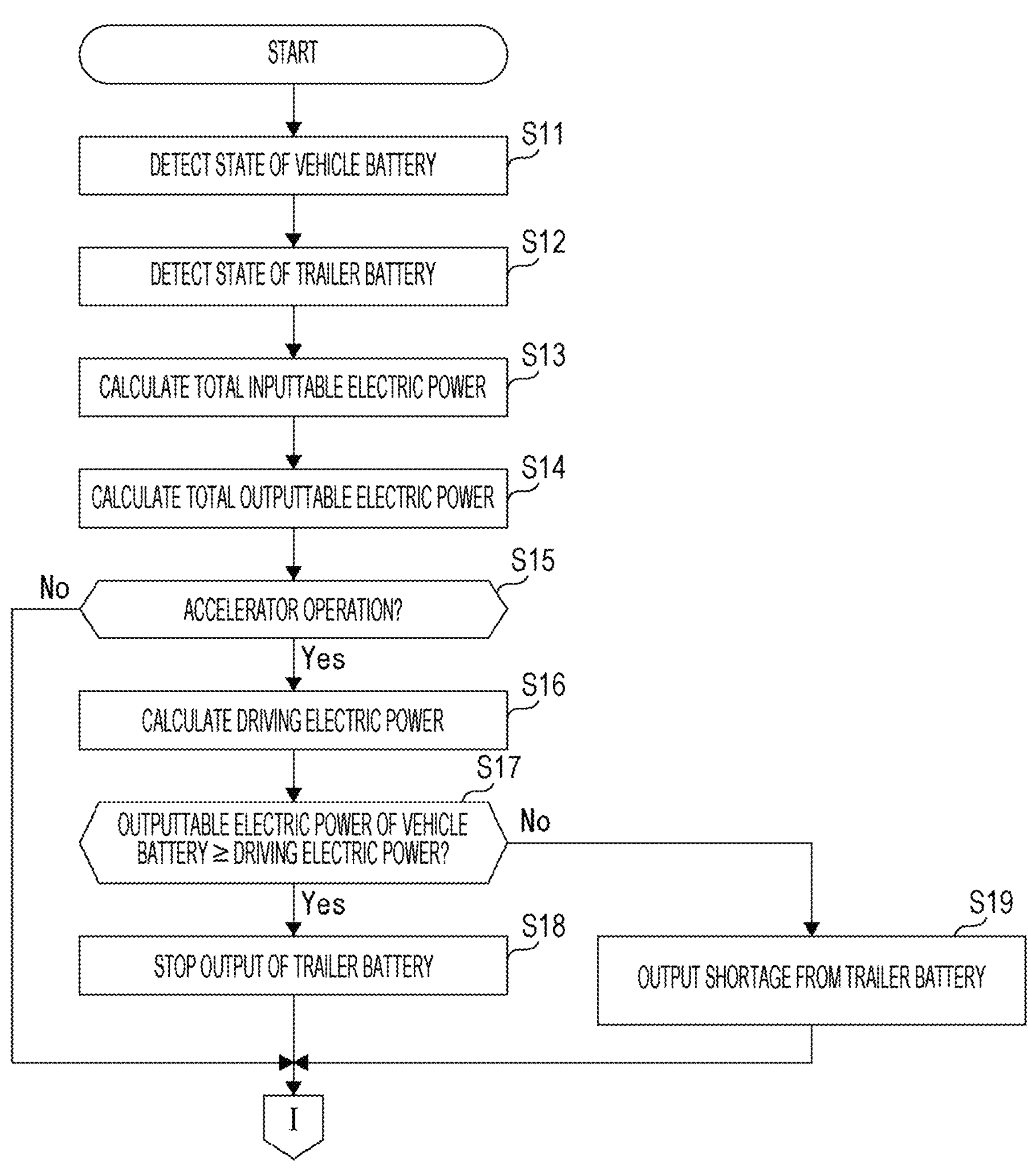
FIG. 6 is a flowchart illustrating a process in the boost mode.
Figure 7:
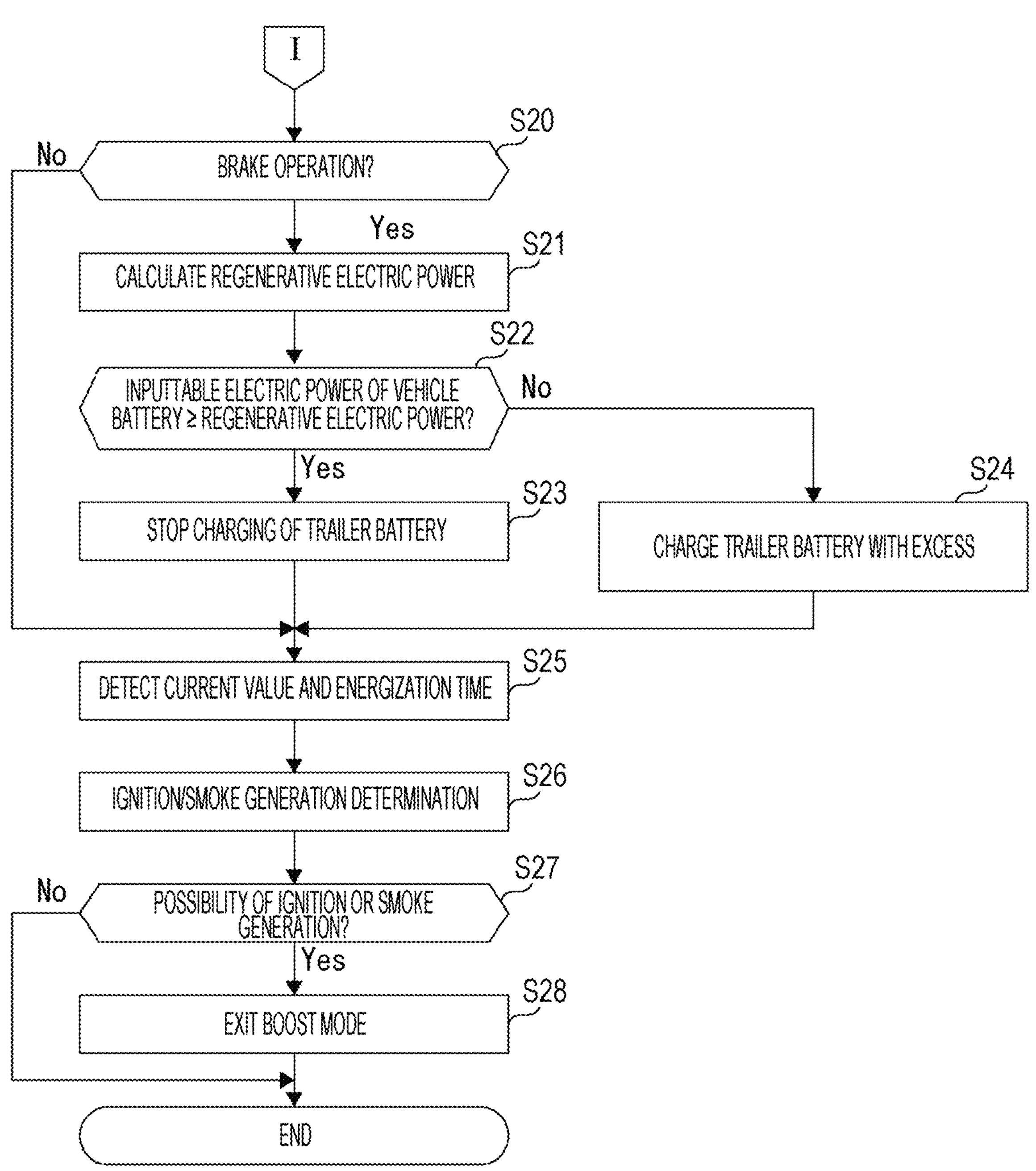
FIG. 7 is a flowchart illustrating the process in the boost mode.

FIG. 6 and FIG. 7 are a flowchart illustrating a process in the boost mode. When the boost mode is set by the mode setter 31, the controller 14 performs a process as illustrated in FIG. 6 and FIG. 7. In step S11, the state detector 32 detects the state of the vehicle battery 13. Here, the state detector 32 detects the SOC, the inputtable electric power, and the outputtable electric power of the vehicle battery 13.

Subsequently, in step S12, the state detector 32 detects the state of the trailer battery 22. Here, the state detector 32 detects the SOC, the inputtable electric power, and the outputtable electric power of the trailer battery 22.

In step S13, the power supply controller 33 calculates the sum of the inputtable electric power of the vehicle battery 13 detected in step S11 and the inputtable electric power of the trailer battery 22 detected in step S12 to calculate inputtable electric power as a whole (hereinafter referred to as "total inputtable electric power").

In step S14, the power supply controller 33 calculates the sum of the outputtable electric power of the vehicle battery 13 detected in step S11 and the outputtable electric power of the trailer battery 22 detected in step S12 to calculate outputtable electric power as a whole (hereinafter referred to as "total outputtable electric power").

In step S15, the power supply controller 33 determines whether an accelerator pedal of the vehicle 2 has been operated. If the accelerator pedal has not been operated (No in step S15), the process proceeds to step S20.

On the other hand, if the accelerator pedal has been operated (Yes in step S15), in step S16, the power supply controller 33 sets a target acceleration based on the amount of operation (depression) of the accelerator pedal and the speed (vehicle speed) of the vehicle 2. Then, the power supply controller 33 calculates the driving force of the motor generator 11 such that the set target acceleration can be achieved. The power supply controller 33 further calculates electric power (driving electric power) to be used to output the calculated driving force from the motor generator 11. In a case where the calculated driving electric power exceeds the total outputtable electric power, the driving electric power is limited to the total outputtable electric power.

Subsequently, in step S17, the power supply controller 33 determines whether the outputtable electric power of the vehicle battery 13 is equal to or greater than the driving electric power. If the outputtable electric power of the vehicle battery 13 is equal to or greater than the driving electric power (Yes in step S17), the driving electric power to be used for the motor generator 11 to output the calculated driving force can be supplied by the vehicle battery 13 alone.

In step S18, accordingly, the power supply controller 33 controls the vehicle battery 13 to output the driving electric power to the motor generator 11, and stops the output of the electric power from the trailer battery 22. That is, the power supply controller 33 drives the motor generator 11 by preferentially using the vehicle battery 13.

On the other hand, if the outputtable electric power of the vehicle battery 13 is not equal to or greater than the driving electric power (No in step S17), the driving electric power for the motor generator 11 to output the calculated driving force is not fully supplied by the vehicle battery 13 alone.

In step S19, accordingly, the power supply controller 33 controls the vehicle battery 13 to output the outputtable electric power, and also controls the trailer battery 22 to output the electric power (shortage) obtained by subtracting the outputtable electric power of the vehicle battery 13 from the driving electric power.

Accordingly, in the vehicle system 1, the motor generator 11 can be driven by simultaneously using the electric power of the vehicle battery 13 and the electric power of the trailer battery 22. That is, the driving performance can be improved in the vehicle system 1.

As illustrated in FIG. 7, in step S20, the power supply controller 33 determines whether a brake pedal of the vehicle 2 has been operated. If the brake pedal has not been operated (No in step S20), the process proceeds to step S25.

On the other hand, if the brake pedal has been operated (Yes in step S20), in step S21, the power supply controller 33 sets a target deceleration based on the amount of operation (depression) of the brake pedal and the speed (vehicle speed) of the vehicle 2. Then, the power supply controller 33 calculates a braking force of the motor generator 11 such that the set target deceleration can be achieved. The power supply controller 33 further calculates electric power (regenerative electric power) that can be regenerated by the motor generator 11 using the calculated braking force. In a case where the calculated regenerative electric power exceeds the total inputtable electric power, the regenerative electric power is limited to the total inputtable electric power.

Subsequently, in step S22, the power supply controller 33 determines whether the inputtable electric power of the vehicle battery 13 is equal to or greater than the regenerative electric power. If the inputtable electric power of the vehicle battery 13 is equal to or greater than the regenerative electric power (Yes in step S22), all of the electric power regenerated by the motor generator 11 can be used for charging the vehicle battery 13.

In step S23, accordingly, the power supply controller 33 performs control to input all of the electric power regenerated by the motor generator 11 to the vehicle battery 13 and to stop the input of electric power to the trailer battery 22. That is, the power supply controller 33 preferentially charges the vehicle battery 13.

On the other hand, if the inputtable electric power of the vehicle battery 13 is not equal to or greater than the regenerative electric power (No in step S22), all of the electric power regenerated by the motor generator 11 cannot be used for charging the vehicle battery 13.

In step S24, accordingly, the power supply controller 33 performs control such that the inputtable electric power of the vehicle battery 13 out of the electric power regenerated by the motor generator 11 is input to the vehicle battery 13 and the electric power (excess) obtained by subtracting the inputtable electric power of the vehicle battery 13 from the regenerative electric power is input to the trailer battery 22.

Accordingly, in the vehicle system 1, the vehicle battery 13 and the trailer battery 22 are charged simultaneously.

In step S25, the power supply controller 33 detects the current values of the currents input to and output from the vehicle battery 13 and the trailer battery 22, and the energization time. Here, the sum of the current values of the currents input to and output from the vehicle battery 13 and the trailer battery 22 is calculated to detect the energization time and the current value of the current passing through the circuit 15.

In step S26, the power supply controller 33 refers to the smoke generation characteristics of the circuit 15 and performs ignition/smoke generation determination to determine the possible occurrence of ignition or smoke generation in the circuit 15.

Figure 8:
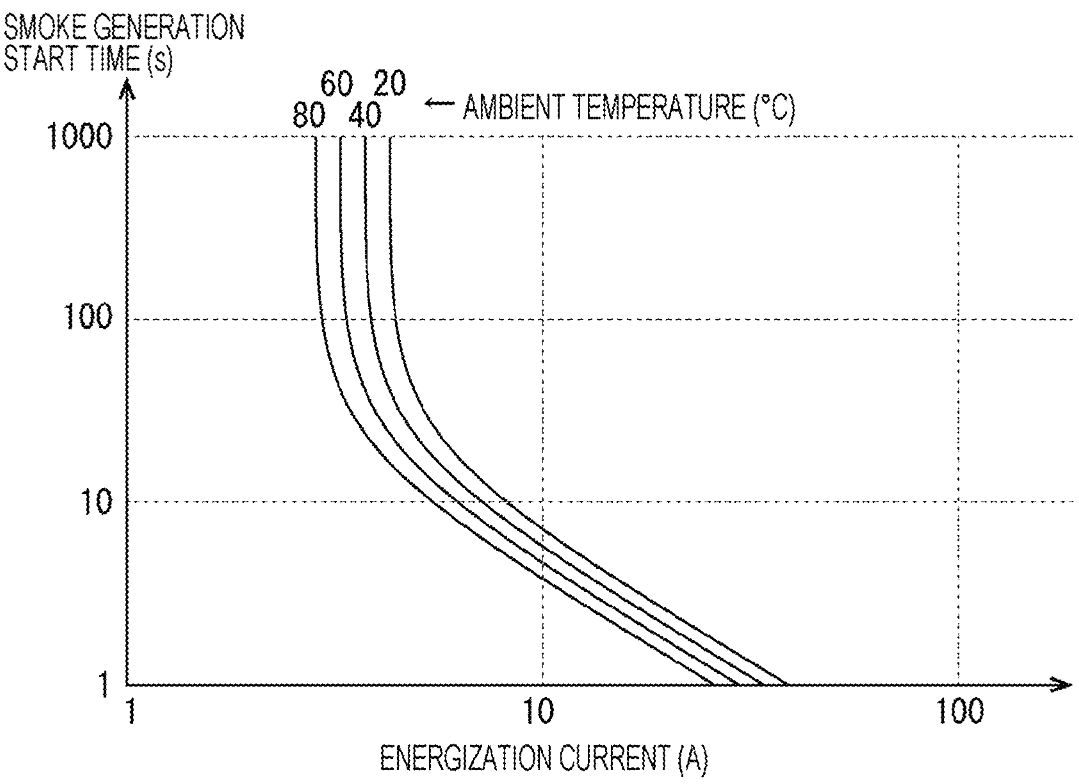
FIG. 8 is a graph illustrating smoke generation characteristics.

FIG. 8 is a graph illustrating smoke generation characteristics. In FIG. 8, the vertical axis represents the smoke generation start time (s), and the horizontal axis represents the energization current (A).

As illustrated in FIG. 8, in the smoke generation characteristics, the smoke generation start time with respect to the energization current is defined for each ambient temperature. The smoke generation characteristics indicate that the possibility of generating smoke in a short time increases as the energization current increases. It is also indicated that the possibility of generating smoke in a short time increases as the ambient temperature increases.

In the vehicle 2, a smoke generation characteristic map indicating the smoke generation characteristics of the circuit 15 is stored in advance in a memory.

The power supply controller 33 uses the results detected in step S25 to calculate, for example, a current value at the present time, an average current value for the past one second, an average current value for the past 10 seconds, and an average current value for the past 100 seconds.

Then, the power supply controller 33 refers to the smoke generation characteristic map and performs the ignition/smoke generation determination based on the calculated current value or average values of the current values for the different time periods.

In step S27, the power supply controller 33 determines whether there is a possibility of ignition or smoke generation in the circuit 15. If there is no possibility of ignition or smoke generation in the circuit 15 (No in step S27), the process ends.

On the other hand, if there is a possibility of ignition or smoke generation in the circuit 15 (Yes in step S27), in step S28, the mode setter 31 exits the boost mode and sets the normal mode. Then, the process ends.

Accordingly, the vehicle system 1 does not allow simultaneous input and output of electric power from the vehicle battery 13 and the trailer battery 22 to the motor generator 11, and allows input and output of electric power from only the vehicle battery 13 to the motor generator 11. In the vehicle system 1, therefore, the possibility of ignition or smoke generation in the circuit 15 due to the flow of a large current can be reduced, and safety can be maintained or improved.

In the embodiment described above, the ignition/smoke generation determination involves calculating a current value at the present time, an average current value for the past one second, an average current value for the past 10 seconds, and an average current value for the past 100 seconds. These time periods are merely examples, and average values of current values for different predetermined time periods before the present time are calculated.

4. Modifications

While an embodiment of the disclosure has been described, the disclosure is not limited to the specific examples described above, and various configurations may be adopted.

For example, in the embodiment described above, the smoke generation characteristics are referred to based on the current value (load) of the current flowing through the circuit 15 and the energization time to determine the possibility of ignition or smoke generation in the circuit 15. However, the disclosure is not limited to the embodiment as long as the power supply controller 33 can determine the possibility of ignition or smoke generation in the circuit 15 based on the load of the circuit 15. For example, the power supply controller 33 may directly measure the temperature (load) of the circuit 15 to determine the possibility of ignition or smoke generation. Alternatively, the power supply controller 33 may calculate the amount of heat generation (load) of the circuit 15 based on a resistance value and the current value of the current flowing through the circuit 15 and determine the possibility of ignition or smoke generation based on the calculated amount of heat generation.

In the embodiment described above, furthermore, in a case where there is a possibility of occurrence of smoke generation in the circuit 15 in the boost mode, input and output of electric power of the trailer battery 22 is restricted. However, input and output of electric power of one of the vehicle battery 13 and the trailer battery 22 may be restricted.

5. Summary of Embodiment

As described above, in the embodiment, the vehicle 2 includes the vehicle battery 13, the motor generator 11 configured to receive and output electric power from and to the vehicle battery 13 and an external battery (the trailer battery 22) disposed outside the vehicle 2, the circuit 15 configured to couple the vehicle battery 13 and the external battery to the motor generator 11, and the controller 14 configured to control the vehicle battery 13 and the external battery. When the input and output of electric power of both the vehicle battery 13 and the external battery are available, the controller 14 restricts input and output of electric power of one of the vehicle battery 13 and the external battery, based on the load applied to the circuit 15.

Accordingly, the vehicle 2 can drive the motor generator 11 by the electric power simultaneously output from both the vehicle battery 13 and the trailer battery 22, and the driving performance can be improved.

In the vehicle 2, furthermore, even when a high load is applied to the circuit 15, input and output of electric power of one of the vehicle battery 13 and the trailer battery 22 is restricted, thereby making it possible to reduce ignition or smoke generation in the circuit 15.

In this way, the vehicle 2 can maintain safety while improving power performance.

The controller 14 stops the output of electric power from the external battery (the trailer battery 22) when electric power outputtable from the vehicle battery 13 (outputtable electric power) is equal to or greater than electric power to be used by the motor generator 11 (driving electric power).

Accordingly, the vehicle 2 can preferentially use the vehicle battery 13.

The controller 14 stops supply of electric power to the external battery (the trailer battery 22) when electric power inputtable to the vehicle battery 13 (inputtable electric power) is equal to or greater than the regenerative electric power of the motor generator 11.

Accordingly, the vehicle battery 13 can be preferentially charged.

The controller 14 refers to the smoke generation characteristic map and determines whether to restrict input and output of electric power of one of the vehicle battery 13 and the external battery (the trailer battery 22), based on the current value of a high-voltage circuit and the energization time of the high-voltage circuit.

Accordingly, input and output of electric power of one of the vehicle battery 13 and the trailer battery 22 can be restricted before the circuit 15 ignites or generates smoke, and safety can be maintained.

The controller 14 refers to the smoke generation characteristic map and restricts input and output of electric power of the external battery, based on the current value at the present time and average current values for different predetermined time periods before the present time.

Accordingly, even when the current value of the current passing through the circuit 15 changes, the possibility of smoke generation in the circuit 15 can be accurately detected.

According to an embodiment of the disclosure, it is possible to maintain safety while improving power performance.

The invention claimed is:

1. A vehicle comprising:

a vehicle battery;

a motor generator configured to receive electric power from, and output electric power to, the vehicle battery and an external battery disposed outside the vehicle;

a circuit configured to couple the vehicle battery and the external battery to the motor generator; and a controller configured to control the vehicle battery and the external battery, in one of a first mode and a second mode, wherein the first mode is a normal mode in which electric power transfer is effected between the motor generator and the vehicle battery, electric power transfer is effected between the vehicle battery and the external battery, and electric power transfer is not between the motor generator and the external battery, the second mode is a boost mode in which electric power transfer is effected between the motor generator and the vehicle battery, electric power transfer is effected between the motor generator and the external battery, and electric power is simultaneously supplied from the vehicle battery and the external battery to the motor generator, and the controller is configured to shift from the second mode to the first mode when, in the second mode, a load applied to the circuit exceeds a predetermined load.

2. The vehicle according to claim 1, wherein in the first mode, the electric power transfer between the vehicle battery and the external battery comprises charging from the external battery to the vehicle battery.

3. The vehicle according to claim 2 wherein in the second mode, the controller is configured to refer to a smoke generation characteristic map and determine whether to restrict input and output of electric power of one of the vehicle battery and the external battery, based on a current value of the circuit and an energization time of the circuit.

4. The vehicle according to claim 3, wherein the controller is configured to refer to the smoke generation characteristic map and determine whether to restrict input and output of electric power of one of the vehicle battery and the external battery, based on a current value at a present time and average current values for different predetermined time periods before the present time.

5. The vehicle according to claim 1, wherein in the second mode, the controller is configured to stop output of electric power from the external battery to the motor generator when electric power outputtable from the vehicle battery is equal to or greater than electric power to be used by the motor generator.

6. The vehicle according to claim 5 wherein in the second mode, the controller is configured to refer to a smoke generation characteristic map and determine whether to restrict input and output of electric power of one of the vehicle battery and the external battery, based on a current value of the circuit and an energization time of the circuit.

7. The vehicle according to claim 6, wherein the controller is configured to refer to the smoke generation characteristic map and determine whether to restrict input and output of electric power of one of the vehicle battery and the external battery, based on a current value at a present time and average current values for different predetermined time periods before the present time.

8. The vehicle according to claim 1, wherein in the second mode, the controller is configured to stop input of electric power to the external battery when electric power inputtable to the vehicle battery is equal to or greater than regenerative electric power generated by the motor generator.

9. The vehicle according to claim 8 wherein in the second mode, the controller is configured to refer to a smoke generation characteristic map and determine whether to restrict input and output of electric power of one of the vehicle battery and the external battery, based on a current value of the circuit and an energization time of the circuit.

10. The vehicle according to claim 9, wherein the controller is configured to refer to the smoke generation characteristic map and determine whether to restrict input and output of electric power of one of the vehicle battery and the external battery, based on a current value at a present time and average current values for different predetermined time periods before the present time.

11. The vehicle according to claim 1 wherein in the second mode, the controller is configured to refer to a smoke generation characteristic map and determine whether to restrict input and output of electric power of one of the vehicle battery and the external battery, based on a current value of the circuit and an energization time of the circuit.

12. The vehicle according to claim 11, wherein the controller is configured to refer to the smoke generation characteristic map and determine whether to restrict input and output of electric power of one of the vehicle battery and the external battery, based on a current value at a present time and average current values for different predetermined time periods before the present time.

* * * * *